United States Patent [19]

Tsuchida et al.

[11] Patent Number: 4,506,755
[45] Date of Patent: Mar. 26, 1985

[54] REAR SUSPENSION SYSTEM FOR MOTORCYCLES

[76] Inventors: Tetsuo Tsuchida, 1-25-6, Nishi-mizuhodai, Fujimi-shi, Saitama; Satoru Horiike, 6-13-11, Shimo-shakujii, Nerima-ku, Tokyo, both of Japan

[21] Appl. No.: 448,643

[22] Filed: Dec. 10, 1982

[30] Foreign Application Priority Data

Dec. 11, 1981 [JP]  Japan .................................. 56-200385
Feb. 5, 1982 [JP]  Japan .................................. 57-18051

[51] Int. Cl.³ ............................................. B62K 25/04
[52] U.S. Cl. ..................................... 180/227; 280/284
[58] Field of Search ............... 180/227, 219; 280/284, 280/283

[56] References Cited

U.S. PATENT DOCUMENTS 4,076,271  2/1978  Doncque ............................ 180/227
4,322,088  3/1982  Miyakoshi et al. .................. 180/227
4,360,214  11/1982  Isono .................................. 280/284

FOREIGN PATENT DOCUMENTS 2086319  5/1982  United Kingdom ............... 180/227

Primary Examiner—Joseph F. Peters, Jr.
Assistant Examiner—D. Lynn Fugate

[57] ABSTRACT

A rear suspension system in a motorcycle having a body frame and a rear wheel. The rear suspension system comprises a rear wheel supporting member swingably pivoted at its front end to the body frame and pivotably supporting at its rear end the rear wheel, a damper pivoted to the body frame, and a progressive link mechanism having first and second pivot points pivoted to the damper and the rear wheel supporting member, respectively. The progressive link mechanism progressively transmits the movement of the second pivot point to the first pivot point, and is disposed substantially above the rear wheel supporting member. Auxiliary devices such as a muffler and a stand can be effectively disposed below the rear wheel supporting member and at the same time a required bank angle is attained.

8 Claims, 7 Drawing Figures

REAR SUSPENSION SYSTEM FOR MOTORCYCLES

BACKGROUND OF THE INVENTION

1. Field of the Invention

The present invention relates generally to an improved rear suspension system. More particularly, the invention relates to an improved rear suspension system for motorcycles which includes a progressive link mechanism which progressively increases the compression stroke of a rear wheel cushioning damper as the swing stroke of a rear wheel support member increases.

2. Description of Relevant Art

A known rear suspension system for motorcycles which absorbs and cushions a swinging motion of a rear wheel supporting member about its front end together with a rear wheel in following undulations of the road surface, which rear wheel supporting member supports the rear wheel at its rear end while the front end thereof is vertically pivotably connected to a vehicle body frame, in the form of a progressive link mechanism type rear suspension system, for example, is disclosed in U.S. Pat. No. 4,360,214 issued Nov. 23, 1982. In such progressive link mechanism type rear suspension system, a rear wheel cushioning damper is connected at one end thereof to a vehicle body frame and at the other end thereof to a rear wheel supporting member through a first link, and the body frame and the first link are interconnected through a second link. As the rear wheel supporting member swings upwardly, the damper is compressed through the first link and at the same time the first link is pivotally moved by the second link about its connection with the rear supporting member, so that the amount of pivotal movement of the first link is added to the compression stroke of the damper. In this manner, the damping force characteristic of the damper is defined as a progressive characteristic which increases in a quadratic curve-wise manner as the swing stroke of the rear wheel supporting member increases.

When turning a motorcycle, there is performed a banking operation for tilting the body in the turning direction. Therefore, for motorcycles in general, including those provided with a rear suspension system incorporating the aforesaid progressive link mechanism, it is required in designing the rear suspension system to take into consideration the arrangement of members and devices, such as a muffler and a stand, disposed on the lower surface side of the rear wheel supporting member.

In addition, required devices of the motorcycle, such as an air cleaner and a battery for example, are attached to the body. Thus, it is necessary to provide sufficient space for arrangement of such devices, and to this end it is necessary to take into consideration the positional relationship among the first and second links and the damper in order to attain a compact construction of the progressive link mechanism type rear suspension system as a whole.

Further, in order to maintain favorable driving posture characteristics of motorcycles, it is desirable that the vehicular center of gravity be set in as low a position as possible. Thus, in the aforesaid type of progressive link mechanism, it is desirable to lower the position of the center of gravity of the damper to the greatest possible extent.

The present invention provides an improved rear suspension system which effectively meets the foregoing demands.

SUMMARY OF THE INVENTION

The present invention provides a rear suspension system in a motorcycle having a body frame and a rear wheel, which rear suspension system comprises a rear wheel supporting member pivotably swingably connected at its front end to the body frame and pivotably supporting at its rear end the rear wheel, a damper pivotably connected to the body frame and a progressive link mechanism having first and second pivot points pivotably connected to the damper and the rear wheel supporting member, respectively, wherein the movement of the second pivot point is progressively transmitted to the first pivot point, the progressive link mechanism being disposed substantially above the rear wheel supporting member.

It is an object of the present invention to provide a rear suspension system in a motorcycle of the type wherein a swinging motion of the rear wheel supporting member is cushioned by the damper and the progressive link mechanism. Such suspension system, while providing a required bank angle, permits an effective arrangement of auxiliary devices such as a muffler and a stand substantially below the rear wheel supporting member.

It is another object of the present invention to provide a rear suspension system in the above-mentioned type of motorcycle, wherein a required operating space of the progressive link mechanism is relatively reduced, a more compact construction as a whole is attained and particularly in the vertical direction, and further wherein auxiliary devices such as an air cleaner and a battery are more efficiently arranged.

It is a further object of the present invention to provide a suspension system in the aforesaid type of motorcycle wherein the center of gravity, particularly that of the damper, is set in a lower position.

The above and further objects, details and advantages of the present invention will become apparent from the following detailed description of preferred embodiments, when read in conjunction with the accompanying drawings.

DETAILED DESCRIPTION OF PREFERRED EMBODIMENTS

Figure 1:
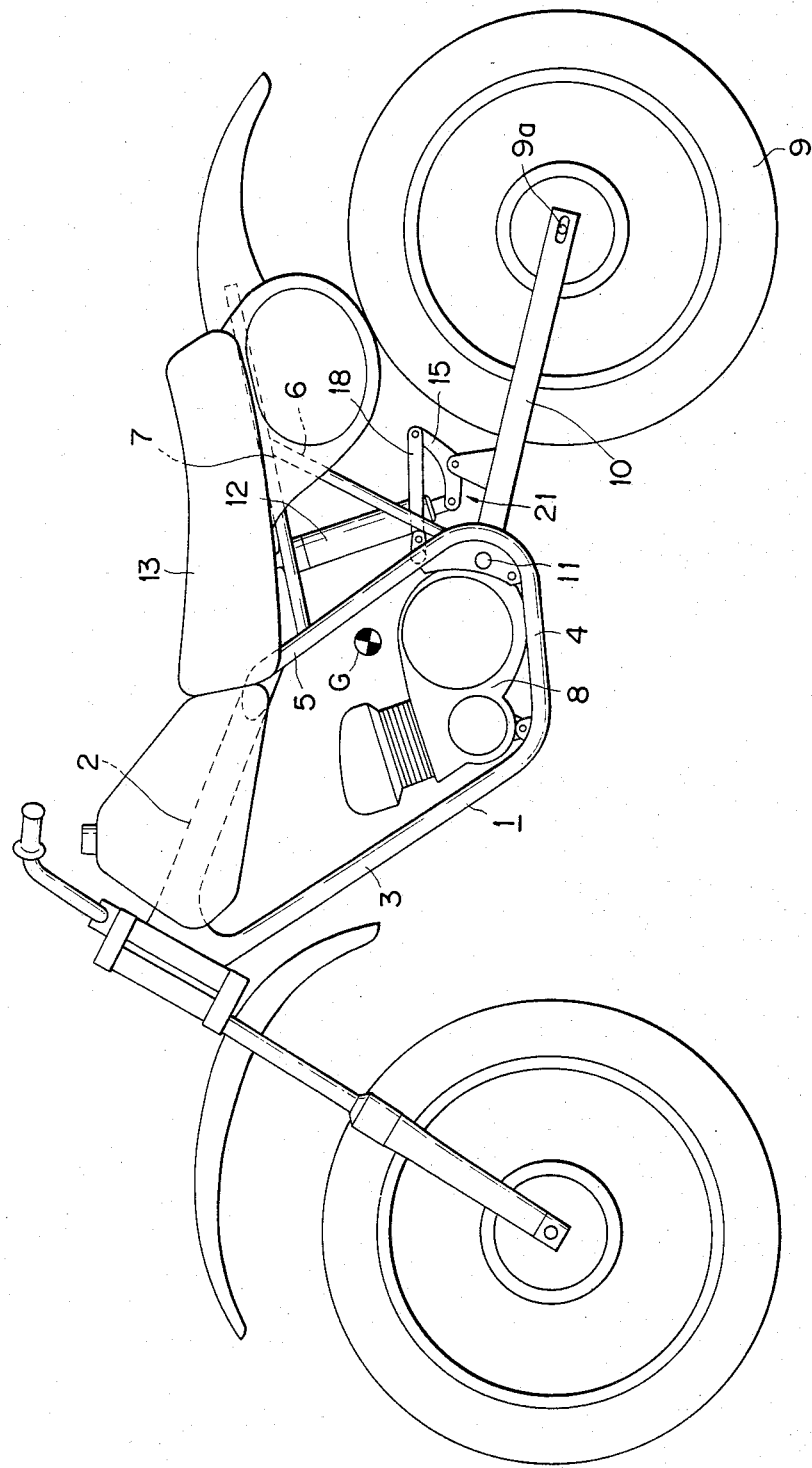
FIG. 1 is a side view of a motorcycle provided with a rear suspension system in accordance with a first embodiment of the present invention.

With reference to FIG. 1, there is shown an overall side view of a motorcycle including a body frame 1 comprising a main frame 2, a down tube 3, a bottom frame 4, a rear frame 5, a sub-frame 6 and a seat rail frame 7; and an engine 8 mounted on the bottom frame 4. An axle 9a of a rear wheel 9 is supported by the rear end of a rear fork 10. The front end of the rear fork 10 thus serving as a rear wheel supporting member is vertically pivotably connected to the body frame 1 through a pivot shaft 11. A rear wheel cushioning damper 12 comprises a strut damper and a coiled spring, and one damper 12 is disposed substantially centrally in the vehicular transverse direction or in the vicinity thereof. Because the damper 12 is disposed in proximity to the vehicular center of gravity G existing near the engine 8, the moment of inertia about G is diminished. The damper 12 is attached to the body frame 1 by connecting its upper end to a body frame constituent member positioned below a seat 13, and is pivotable in the longitudinal direction about a shaft 14 shown in FIG. 2.

Figure 2:
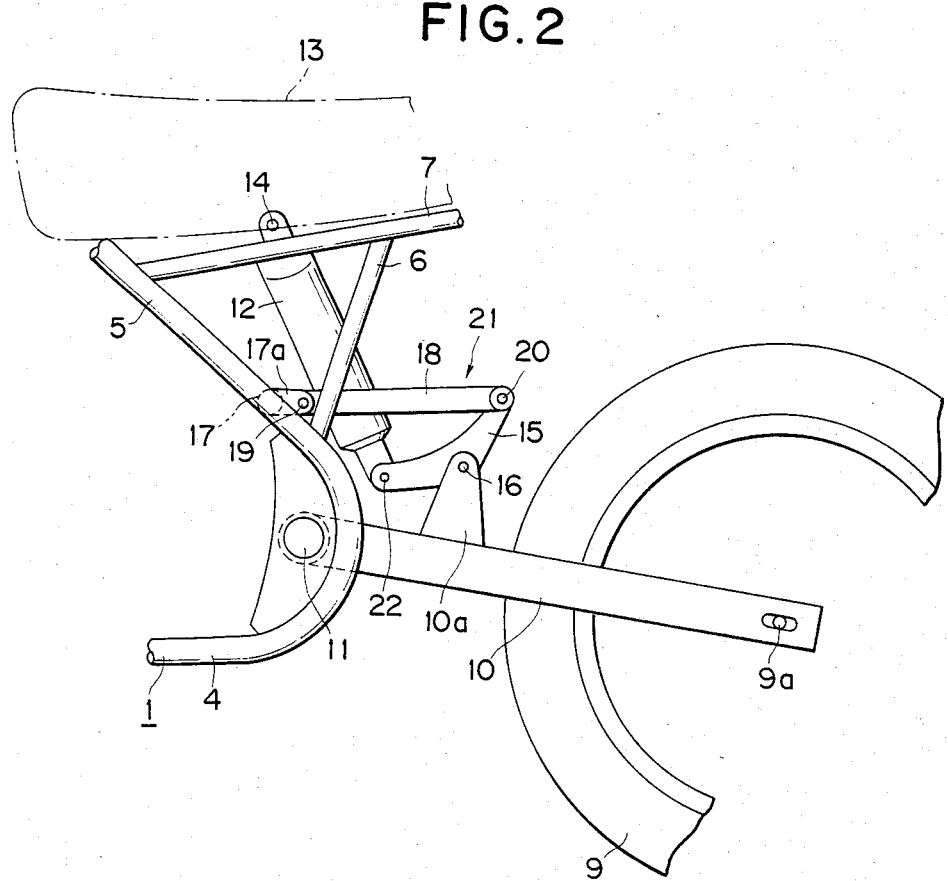
FIG. 2 is an enlarged side view of a principal portion of the motorcycle including the rear suspension system shown in FIG. 1.

As shown in FIG. 2, a stay 10a projects from the upper surface of the rear fork 10, and a first link 15 serving as a cushion arm is connected thereto vertically pivotably through a shaft 16. The lower end of the damper 12 and the rear fork 10 are interconnected through the first link 15. Between the two right and left rear frames 5 is mounted a cross bar 17, from which a stay 17a projects rearwardly, and the front end of a second link 18 serving as a tension rod is connected to the stay 17a through a shaft 19, the rear end of the second link 18 being connected to the first link 15 through a shaft 20. In this manner, the body frame 1 and the first link 15 are interconnected through the second link 18, and a progressive link mechanism 21 is defined by the first and second links 15, 18.

When the rear fork 10 swings upwardly about the pivot shaft 11 as the rear wheel 9 follows undulations of the road surface, the damper 12 is compressed by the first link 15 which moves upwardly together with the rear fork 10 and at the same time, because the distance between the shaft 19 and 20 is kept constant by the second link 18, the first link 15 is pivotably moved in a clockwise direction about the shaft 16 by means of the second link 18 which moves pivotably while describing an arcuate locus downwardly about the shaft 19. Thus, the compression stroke of the damper 12 becomes the sum of the swing stroke of the rear fork 10 and the pivoting amount of the first link 15, and the damping force characteristic of the damper 12 becomes a progressive characteristic wherein the compression stroke and the damping force increase progressively with increases in swing stroke of the rear fork 10.

The first link 15 and second link 18, like the damper 12, are disposed on the upper surface side of the rear fork 10, so that the space for the members disposed on the lower surface side of the rear fork 10, such as a muffler and a stand, is not constricted by the progressive link mechanism 21. Such members can thus be disposed efficiently in a position above the ground so that a bank angle required for the vehicle is effectively attained.

Figure 3:
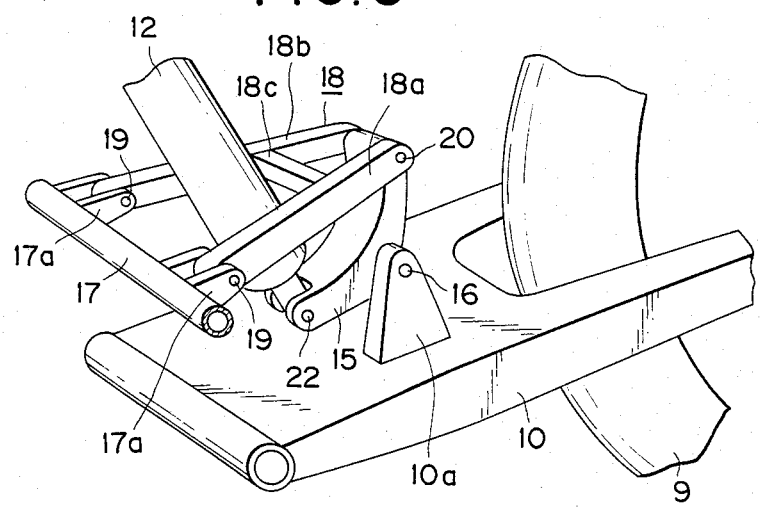
FIG. 3 is a perspective view of the rear suspension system of FIG. 2.

As shown in FIG. 2, although the first link 15 is curved upwardly in side elevation, its lengthwise direction is in the vehicular longitudinal direction, and it is connected at a longitudinally intermediate portion thereof to the rear wheel supporting member 10 through the shaft 16. To the rear portion of the first link 15 is connected the second link 18 through a shaft 20, while to its front portion is connected the damper 12 through a shaft 22, the damper 12 and the second link 18 crossing each other in side elevation. The second link 18, as shown in FIG. 3, is substantially H-shaped in plan, comprising right and left side rods 18a and 18b and a cross rod 18c which interconnects the side rods 18a and 18b. The front ends of the side rods 18a and 18b are connected to a pair of stays 17a which are provided on the cross bar 17, and the rear ends of side rods 18a and 18b are connected to the first link 15. The damper 12 extends substantially vertically between the side rods 18a and 18b, whereby the aforesaid side crossing is attained while assuring the operation of the progressive link mechanism 21 and the expanding and contracting operation of the damper 12.

By virtue of the arrangement of the damper 12 and the second link 18 as described hereinabove, the damper 12 can be disposed in the dead space originally corresponding to the space for the second link 18, and the damper 12 and the second link 18 are partially disposed in a common space, so that the space occupied in the vehicle body by the damper 12 and the progressive link mechanism 21 is substantially reduced. Thus, the rear suspension system is made more compact and the space for devices such as an air cleaner and a battery is effectively provided around the damper 12 and the progressive link mechanism 21. Further, because the damper 12 is in crossing relation with not the rear side but the front side of the second link 18, a large open space is provided above the second link 18 and behind the damper 12 and at the same time the damper 12 is brought closer to the vehicular center of gravity G, thereby effectively decreasing the moment of inertia.

Further, the first link 15 and second link 18, have a simplified shape and particularly the second link 18 has a shape which permits the damper 12 to pass therethrough substantially vertically while still having a sufficient rigidity to effectively bear the load acting when the damper is compressed. To effect the side crossing relation with the damper 12, the second link 18 may have another suitable shape, for example, it may be Y-shaped in plan.

Additionally, according to the present invention, the length of the first link 15 and that of the second link 18 as well as the inter-shaft distance, for example, the distance between the shafts 16 and 20, can be set as desired while maintaining the positional relationship among the first and second links 15, 18 and the damper 12, so that freedom is assured in setting the progressive characteristic of the damper 12 determined by such length and inter-shaft distance to a characteristic considered desirable for the motorcycle to which the system of the present invention is applied.

Figure 4:
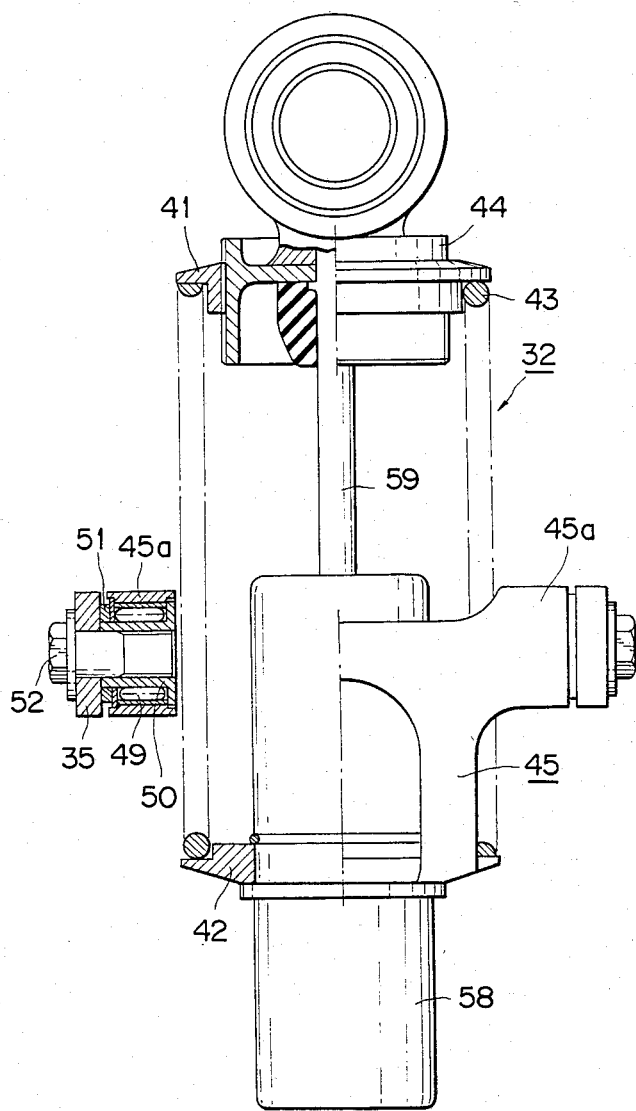
FIG. 4 is a longitudinal sectional view of a damper in a rear suspension system according to a second embodiment of the present invention.
Figure 5:
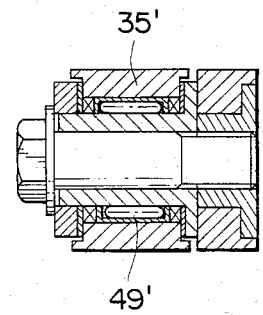
FIG. 5 is a longitudinal sectional view showing a modified embodiment of a principal portion of a bracket member in the damper of FIG. 4.
Figure 6:
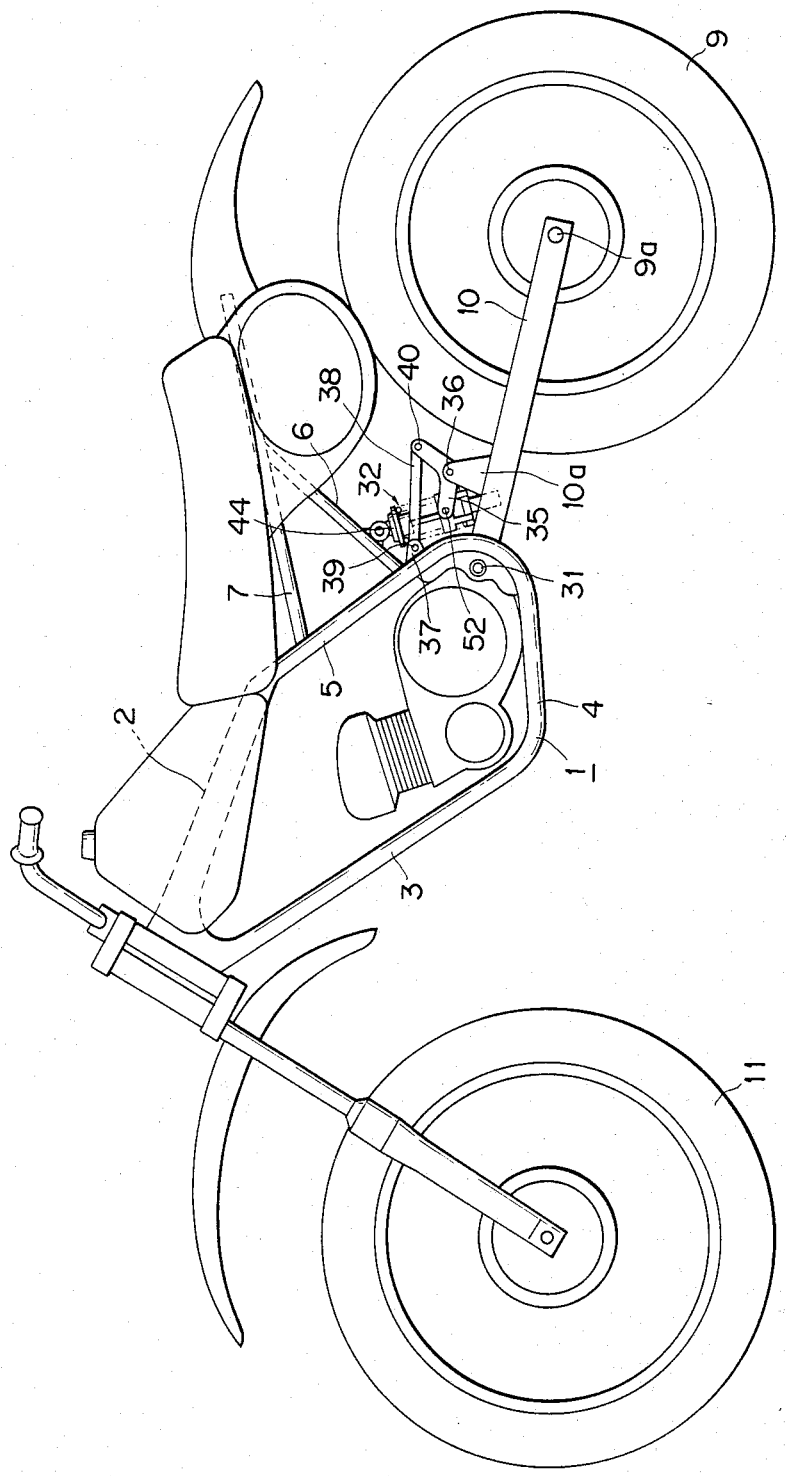
FIG. 6 is a side view of a motorcycle provided with the rear suspension system of FIG. 4.

FIGS. 4 through 6 illustrate a second embodiment of the present invention wherein the connection structure between the damper and the first link in the above-described first embodiment is modified, with like reference numerals used in describing the first embodiment designating like parts in the second embodiment.

As in the first embodiment of the invention, in the present second embodiment one damper 32 is disposed substantially centrally in the vehicular transverse direction, and is constructed as shown in FIG. 4. More specifically, a piston rod 59 is inserted into a cylinder 58, and to the lower end of the piston rod 59 is connected a piston (not shown) having a valve mechanism which slidably engages the inner periphery of the cylinder 58 and which produces a damping force. To the upper end of the piston rod 59 is fixed a mounting member 44, and a hydraulic operating fluid is sealed within the cylinder 58.

An upper seat 41 is fitted on the outer periphery of the mounting member 44 and a lower seat 42 is fitted on the outer periphery of the cylinder 58, with a cushion spring 43 being stretched between the seats 41 and 42.

Extending upwardly from and integrally with the lower seat 42 is a bracket 45, and at side portions of the bracket 45 there project connections 45a in opposed relation to each other.

The upper end of the damper 32 is pivotably connected to the sub-frame 6 through the mounting member 44, as shown in FIG. 6.

On the other hand, to the bracket 10a projecting from the upper surface of the rear fork 10 is pivotally secured a substantially intermediate portion of a first link 35 serving as a cushion arm, through a shaft 36, and the front end of the first link 35 is pivotally connected to the connections 45a of the bracket 45 extending upwardly from the lower seat 45, as shown in FIG. 4. More specifically, within each connection 45a of the bracket 45 is mounted a tubular collar 50 through a needle bearing 49, with the first link 35 being brought into abutment with an outer end face of the collar 50 through a washer 51, and a bolt 52 is inserted from the exterior of the first link 35 and threadedly engaged with the inner peripheral portion of the collar 50, thereby connecting the front end of the first link 35 to the bracket 45.

The connection described above may alternatively be effected by the arrangement shown in FIG. 5 wherein a needle bearing 49' is disposed within a first link 35'.

Further, a bracket 37 is fixed to the rear frame 5, and to the bracket 37 is pivotally connected the front end of a second link 38 serving as a tension rod, through a shaft 39. The rear end of the second link 38 and that of the first link 35 are pivotally mounted on a shaft 40.

A progressive link mechanism is defined by the damper 32, first link 35 and second link 38 as described hereinabove.

Because the damper 32 is supported at its intermediate portion through the bracket 45, its mounting position can be moved downwardly, and therefore the vehicular center of gravity can likewise be moved downwardly, thereby permitting improvement of the travelling stability of the motorcycle.

Figure 7:
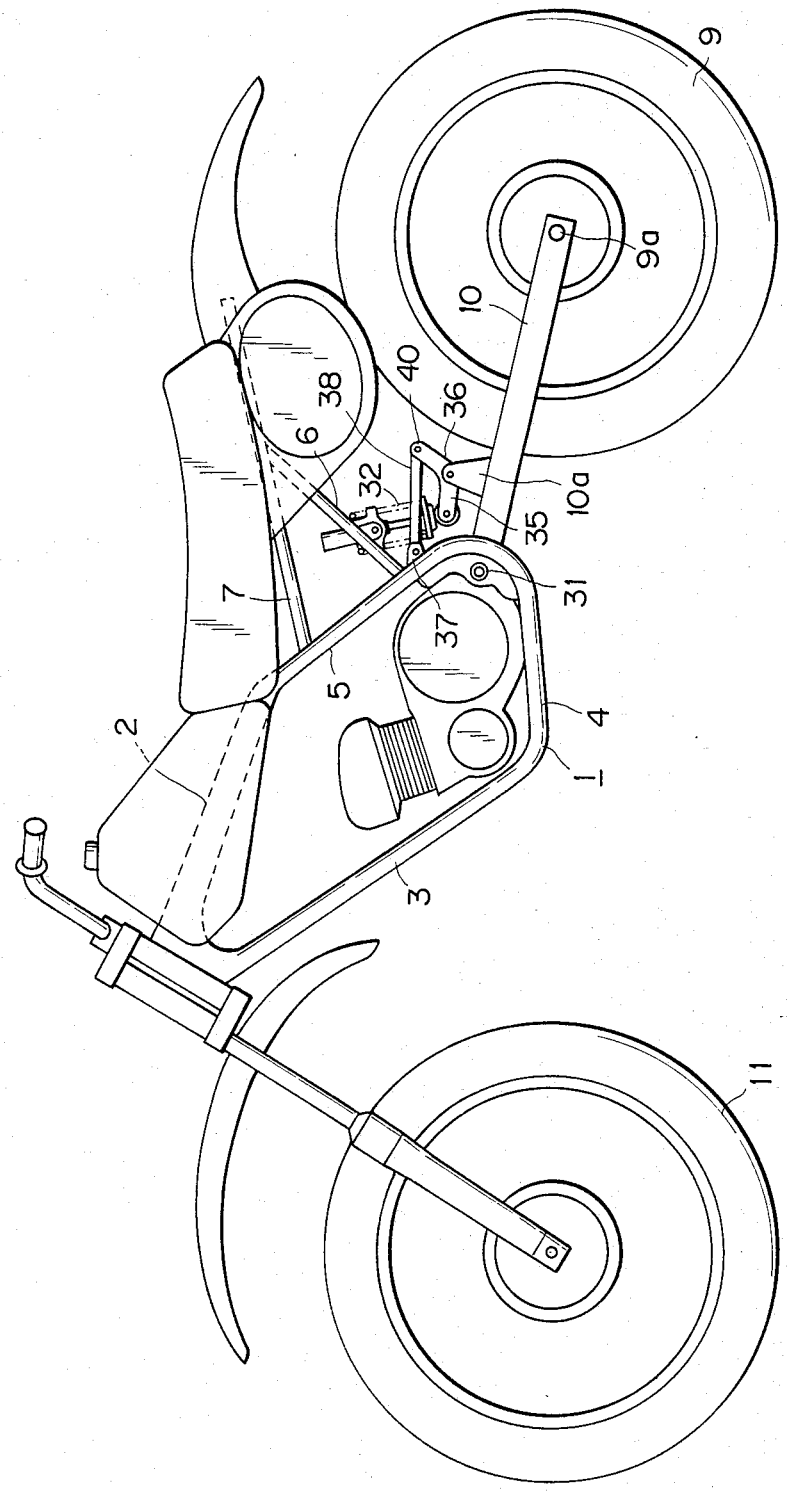
FIG. 7 is a side view of a motorcycle provided with a rear suspension system according to a third embodiment of the invention.

In a third embodiment of the invention shown in FIG. 7, the damper 32 is alternatively pivotally secured at a substantially vertically intermediate portion thereof to the body frame by means of a bracket extending from a seat member of damper 32. In this arrangement, the damper 32 is pivotally connected at the lower end thereof to the front end of the first link 35 (the damper merely being turned 180° relative to the FIG. 6 arrangement).

Although in the foregoing embodiments the invention has been described as applied to a motorcycle incorporating a progressive link mechanism, it will be understood that the invention is applicable to other arrangements as well.

According to the present invention, as apparent from the foregoing description, because the first and second links constituting the progressive link mechanism are disposed on the upper surface side of the rear wheel supporting member, it is possible to dispose a muffler, a stand, etc. on the lower surface side of the rear wheel supporting member without being influenced by the progressive link mechanism, and consequently it is possible to ensure a bank angle required for a motorcycle. Furthermore, the second link and the damper are connected to the rear portion and front portion, respectively, of the first link which is connected at a longitudinally intermediate portion thereof to the rear wheel supporting member, and the damper and the second link are crossed in side elevation, so that the space occupied in the vehicle body by the damper and the progressive link mechanism is substantially reduced and it is possible to effectively dispose therearound devices for the motorcycle such as an air cleaner and a battery. According to the present invention, moreover, because the bracket extends upwardly from and integrally with the lower seat of the damper which constitutes part of the progressive link mechanism and one end of the first link serving as a cushion arm is pivotally connected thereto, the mounting position of the damper with respect to the vehicle body can be moved downwardly, thus permitting a downward shift of the vehicular center of gravity and improvement of the travelling stability of the motorcycle.

Although there have been described what are at present considered to be preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. In a motorcycle having a body frame and a rear wheel, a rear suspension system comprising:
    a rear wheel supporting member having the front end thereof swingably connected to said body frame, and pivotally supporting at the rear end thereof said rear wheel;
    a damper pivotably secured to said body frame;
    a progressive link mechanism having first and second pivot points pivotably connected to said damper and said rear wheel supporting member, respectively, said progressive link mechanism progressively transmitting the movement of said second pivot point to said first pivot point;
    said progressive link mechanism being disposed substantially above said rear wheel supporting member; and
    said progressive link mechanism comprising a first link member provided at a front portion thereof with said first pivot point and at substantially an intermediate portion thereof with said second pivot point, and at least one second link member pivotably connected at the rear end thereof to a rear portion of said first link member and at the front end thereof to said body frame, said second link member being disposed so as to cross said damper in side elevation.

2. A rear suspension system according to claim 1, wherein
    said first link member is substantially L-shaped in side elevation.

3. A rear suspension system according to claim 2, wherein:

said progressive link mechanism includes a pair of said second link members disposed respectively on right and left sides of said damper.

4. A rear suspension system according to claim 1, wherein:
said damper is pivotably secured at the upper end thereof to said body frame and at the lower end thereof to said first pivot point.

5. A rear suspension system according to claim 1, wherein:
said damper is pivotably secured at the upper end thereof to said body frame and at a substantially vertically intermediate portion thereof to said first pivot point.

6. A rear suspension system according to claim 5, wherein:
said damper comprises a substantially vertically disposed strut type damper, a coiled spring member mounted on said damper and a seat member fixed to said damper to support said spring member, said seat member having a bracket member extending substantially in the axial direction of said damper, and said bracket member being pivotably secured to said first pivot point.

7. A rear suspension system according to claim 1, wherein:
said damper is pivotably connected at a substantially vertically intermediate portion thereof to said body frame and at the lower end thereof to said first pivot point.

8. A rear suspension system according to claim 7, wherein:
said damper comprises a substantially vertically disposed strut type damper, a coiled spring member mounted on said damper and a seat member fixed to said damper to support said spring member, said seat member having a bracket member extending substantially in the axial direction of said damper, and said bracket member being pivotably secured to said body frame.

* * * * *

UNITED STATES PATENT AND TRADEMARK OFFICE
CERTIFICATE OF CORRECTION

PATENT NO. : 4,506,755
DATED : March 26, 1985
INVENTOR(S) : Tetsuo TSUCHIDA and Satoru HORIIKE It is certified that error appears in the above-identified patent and that said Letters Patent are hereby corrected as shown below:

Cover Page, column 1, between the lines identifying Inventors and Appln. No., insert --[73] Assignee: HONDA GIKEN KOGYO KABUSHIKI KAISHA, TOKYO, Japan--

Cover Page, column 2, between the lines identifying Assistant Examiner and ABSTRACT, insert --Attorney, Agent or Firm - Irving M. Weiner, Pamela S. Burt and Anthony L. Cupoli--

Signed and Sealed this

Third Day of December 1985

[SEAL]

Attest:

DONALD J. QUIGG

Attesting Officer

Commissioner of Patents and Trademarks